Patented Mar. 1, 1938

2,109,707

UNITED STATES PATENT OFFICE 2,109,707

PROCESS FOR REFINING LEAD

Berry M. O'Harra and Raymond L. Hallows, Joplin, Mo., assignors to The Eagle-Picher Lead Company, Cincinnati, Ohio, a corporation of Ohio No Drawing. Application January 16, 1936, Serial No. 59,476

13 Claims. (Cl. 75—78)

The invention relates to an improved method for removing impurities from lead such as zinc, arsenic, antimony and tin which have a greater affinity for oxygen than lead and can be removed by oxidation.

In a general way it may be said that until recent years the common practice of removing impurities from lead was to heat the impure lead to a red heat (above 1000° F.) in an oxidizing atmosphere, and usually in a reverberatory furnace but sometimes in an iron kettle. The impurities, such as zinc, arsenic, antimony, and tin, were oxidized by the oxygen of the air along with 5% to 10% or more of the lead and skimmed off as a fused or semi-fused slag or a dry dross, depending upon the amount and relative proportions of the different impurities present. Frequently litharge was added to the charge or the metal bath was blown with steam or air to hasten the oxidation. The chief drawbacks to this process were the high cost for labor, fuel, and furnace or kettle repairs, due to the high temperature of operation and the corrosive nature of the oxide slags produced. The slags had to be subsequently resmelted to recover their lead and antimony content.

A process applicable to the removal of zinc from lead comprises treatment with chlorine gas at temperatures below a red heat either by passing chlorine gas through the molten lead or passing a stream of molten lead through a closed chamber containing chlorine gas with the formation of zinc chloride containing very little lead. The presence of the corrosive chlorine gas calls for the use of special apparatus. No by-products are produced which have to be resmelted; however, to obtain the full economic advantage of the process the zinc chloride produced must be refined to obtain a marketable zinc chloride which can be sold to help offset the cost of chlorine gas and operation of the process. In a small refinery this is an undesirable feature.

Still another process for removal of impurities, such as zinc, from molten lead depends upon the reaction of the impurities with fused caustic soda and may be carried out either by stirring caustic into the molten lead by means of an ordinary motor-driven stirrer or by pumping the molten lead repeatedly through a separate vessel containing a deep bath of molten caustic. As the reaction proceeds the molten caustic gradually becomes saturated with sodium oxysalts of the impurities removed, as for example sodium zincate, and grows more viscous until it finally becomes thick and pasty. If sufficient caustic is used so that the final caustic slag produced is not too viscous the amount of lead entrained in the slag is low and does not have to be resmelted. The amount of caustic necessary is considerably in excess of that theoretically required and as caustic soda is comparatively costly the reagent cost in this process is high. The excess caustic can be recovered by leaching the slag with water, filtering off the precipitated zinc oxide and evaporating the solution, but this requires an extensive plant and added operating cost. The treatment can be carried on below a red heat, which makes possible the use of a cast-iron or steel kettle. The chemical reaction is assumed to be

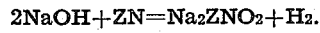
$$2NaOH + Zn = Na_2ZnO_2 + H_2.$$

Although suitable for removal of zinc, this process is not applicable to impurities such as antimony, since caustic soda in the absence of stronger oxidizing agents does not react readily with antimony except at undesirably high temperatures.

Zinc, arsenic, tin, and antimony can all be removed from lead by treatment with caustic at moderate temperatures by a procedure similar to that just described, if at the same time an oxidizing agent such as litharge or nitre is added. This is accomplished by stirring caustic soda into the lead or by circulating a stream of molten lead through a bath of molten caustic and simultaneously adding nitre gradually until the caustic becomes saturated with the sodium oxysalts of zinc, antimony, etc., whereupon it becomes viscous or pasty in form and is removed and the operation repeated until the impurities are entirely removed from the lead. The fused caustic soda acts as a diluent and solvent for the sodium nitrate added, slowing down its action and thereby allowing time for it to come intimately into contact with all portions of the lead bath during the operation. Any lead oxide formed is dissolved in the caustic soda and in this condition can react with impurities remaining in the lead by oxidizing them while being simultaneously reduced back to metallic lead.

By careful operation this process yields a caustic slag comparatively free from lead and that does not have to be resmelted for the recovery of its lead content. However, it requires a complicated treatment for the separation of impurities, the recovery of antimony in marketable form and the excess of free caustic.

It is an object of this invention to provide an improved method for removing impurities from lead such as zinc, arsenic, antimony and tin which have a greater affinity for oxygen than lead and can be removed by oxidation.

Another object of the invention is to remove impurities from impure molten lead at a temperature which will cause only slight loss of metal by volatilization.

A further object of the invention is to provide a method of maximum simplicity, efficiency, economy and ease of assembly and operation and by reason of simplicity a corresponding reduction in operating costs as compared to present processes.

The invention more particularly comprises the addition of sodium nitrate, potassium nitrate or an oxidizing agent of similar strength to the molten lead bath to be purified and stirring it into the bath of impure molten lead at temperatures varying from slightly above its melting point to an incipient red heat (350° C. to 540° C.). To carry out our process lead containing zinc, antimony, arsenic and tin as impurities is charged to a refining kettle heated from below to a temperature varying from 350° C. to 540° C. The operation is performed in and above the refining kettles by means of conventional mixing apparatus comprising an ordinary motor-driven impeller-type lead mixer, preferably of the portable type, which is swung into position over the molten bath and any dross removed before starting the impeller which is operated in such a manner as to produce a decided vortex in the center of the bath. Sodium nitrate is then added gradually while the stirring continues and together with the dross formed by its reaction with the lead and impurities is drawn below the surface at the vortex, rising again around the edge, thus coming into intimate contact with the lead bath. The oxide dross which forms may then be removed or again stirred into the lead and the stirrer removed to skim off the dross. The number of additions of the nitrate reagent as well as the quantities thereof may be varied with respect to such factors as stirring periods, temperature of the bath and the amount of impurities present in the lead subjected to treatment by our process, as well as the capacity of the refining kettle and the size of the stirring apparatus.

In order that the full oxidizing effect of the nitre may be obtained, and in order that the impurities may be effectively oxidized in preference to the lead, without oxidizing an excessive amount of lead, it is essential that the nitre be added slowly and gradually, and that the operation be carried out in such a manner that the nitre be rapidly intermixed with the lead and brought into contact with all portions of the lead bath while the oxidizing reaction is taking place. We preferably accomplish this by stirring the lead so rapidly that a violent swirling action is produced; this results in a deep vortex being formed in the center of the lead bath, and into this vortex we feed the nitre slowly and gradually so that it is drawn beneath the surface of the lead at the vortex and rises to the surface near the periphery, thus immediately coming into intimate contact with all portions of the lead bath. The amount of nitre required to produce a given result can be estimated approximately from a prior analysis of the material to be treated. In practice the usual method for judging the amount of nitre to be added is to add the latter in increments of 50 to 200 pounds, and after the addition of each increment to pour a sample bar of the lead. When the sample bar shows the bluish cast and smooth surface (with no "frosty" looking spots on the surface) characteristic of pure lead, a chemical analysis may be made as a check upon the purity of the lead. An experienced lead refinery man can usually judge fairly accurately from the appearance of a sample bar, when sufficient nitre has been added.

In case it is desired to eliminate an impurity only partially or to eliminate one or more impurities selectively without removing other impurities, recourse must be had to chemical analyses of samples taken at intervals as the nitre is added, though as above stated the amount of nitre to be added can be estimated approximately from a prior analysis, after a little experience with the particular character of material being treated. The percentages of zinc, antimony, arsenic and tin present in the molten bath are of economic importance and the value of the process is heightened by the degree of selectivity possible in the operation since it is possible to remove zinc, antimony, arsenic and tin completely, or to remove one or more of the more readily oxidized impurities while leaving the less readily oxidized impurities in the lead; for example zinc can be removed practically completely from lead containing both zinc and antimony while leaving most of the antimony in the lead. It may be said the nitre appears to have some other action than the mere chemical one inasmuch as the amount of oxide dross produced by a given amount of nitre is greater than can be accounted for by the oxidizing action of the nitre alone. This is particularly true in treating lead containing zinc. Apparently the nitre has some catalytic effect or otherwise produces a condition favorable to the oxidation of zinc and lead by air at a much lower temperature than it would take place in the absence of nitre.

In the removal of impurities with nitre in the presence of caustic soda it has generally been assumed that the nitre oxidizes both impurities and lead indiscriminately, and that the lead oxide thus formed in turn oxidizes further amounts of impurities, so that the final result is the complete selective oxidation and removal of the impurities. This explanation is reasonable in view of the known fact that lead oxide (litharge) added in the presence of fused caustic soda, zinc chloride, or other fused slag which can act as a solvent for the lead oxide, will oxidize impurities at a comparatively low temperature being itself reduced to metallic lead by the reaction. Under these circumstances the lead oxide, being in solution in the fused slag, is more reactive than lead oxide in the solid state would be at the same temperature. When nitre is used alone to remove impurities by our invention, however, the resultant dross formed is not usually liquid, but on the contrary is a dry powdery oxide dross containing the oxides of impurities along with a considerable amount of lead oxide. Since lead oxide by itself oxidizes impurities only very slowly at the temperatures used, the fact that selective oxidation of the impurities, in preference to lead, takes place at all is quite unexpected. Apparently, the selective oxidation of the impurities takes place at the moment of reaction with the nitre. Further stirring the oxide dross into the lead after the decomposition of the nitre is complete does not result in the oxidation of any important further amounts of the impurities.

Without desiring to restrict ourselves to the proportions named, we will give examples of the method for carrying out the process which will possess the advantages described, it being understood that the percentages named are approximate only and that the relative proportions of the material may vary to a reasonable extent without impairing the results.

*Example I*

A bath of molten lead weighing approximately 65 tons and heated slightly above the melting point of lead (650-700° F.) was prepared. Before treatment it contained 0.54% zinc and 0.01% antimony. A lead mixer of the impeller type was then moved into position over the molten bath and driven at a speed which produced a pronounced vortex in the center. In this condition 200 pounds of nitre were added gradually over a period of forty minutes. An oxide dross was formed which was stirred into the lead for an additional period of twenty minutes whereupon the stirrer was removed and the dross, which was a greenish yellow, dry, powdery mixture of oxides, skimmed off. It was found to have a total weight of 3,537 pounds and contained 13.5% zinc and 0.15% antimony. After this treatment the molten lead bath contained 0.12% zinc and 0.01% antimony.

The mixer was again moved into position and driven at a speed to produce a pronounced vortex in the center of the lead bath, whereupon 100 pounds of nitre was added gradually for a period of twenty minutes and the bath then stirred for an additional ten minutes when the dross, which was yellowish in color, was removed. It was found to have a total weight of 1,964 pounds and contained 6.8% zinc and 0.15% antimony. The lead after this treatment contained 0.002% zinc and 0.005% antimony. The mixer was again placed in position and driven at a speed to give a pronounced vortex in the center of the lead bath and 50 pounds of nitre added gradually over a period of twenty minutes and then stirred for an additional ten minutes. The dross, which was a dark, brick red in color, was removed and found to have a total weight of 1,871 pounds with a zinc content of 0.25% and an antimony content of 0.15%. The lead after this treatment contained less than 0.001% zinc and 0.0003% antimony.

In the operation just described nitre equal to 350 pounds was used and dross weighing 7,372 pounds was recovered.

*Example II*

A bath of molten lead weighing approximately 65 tons and heated to a temperature of approximately 750° Fahrenheit was prepared. Before treatment it contained copper .062%, antimony .37%, tin .17%, and arsenic .01%. A lead mixer of the impeller type was then moved into position over the molten bath and driven at a speed which produced a pronounced vortex in the center. At this point 100 pounds of sodium nitrate were added gradually over a period of twenty-five minutes. The stirrer was then removed and the dross skimmed off. 200 pounds of nitre was then added for a period of thirty minutes and the dross again removed. This same treatment was then repeated, using 200 pounds of nitre each time, until a total of 1,300 pounds of nitre had been added. The total amount of dross was 10,886 pounds and was found to contain an average of 2.14% antimony, 1.86% tin, and .07% arsenic. An analysis of the lead following this treatment showed copper .06%, antimony .17%, and tin .02%.

Following this treatment zinc was stirred into the lead bath to remove copper by the usual method, and thereafter the molten lead showed the following analysis:

|  | Percent |
|---|---|
| Zinc | .27 |
| Copper | .005 |
| Antimony | .16 |
| Tin | .02 |

The stirrer was then moved into position and driven at a speed to give a pronounced vortex in the center of the bath, when 200 pounds of sodium nitrate were added slowly for a period of thirty minutes. The stirrer was then removed, the dross skimmed off and the stirrer replaced. This treatment was then repeated using 200 pounds of nitre each time until a total of 1,000 pounds of nitre had been added to the molten bath and 10,401 pounds of dross was produced. The final analysis of the molten lead bath was:

|  | Percent |
|---|---|
| Zinc | .0005 |
| Copper | .005 |
| Antimony | .0005 |
| Tin | Trace |
| Arsenic | .0009 |

The total amount of nitre used in the preliminary and final treatments was 2,300 pounds and the total amount of dross produced was 21,287 pounds.

Having thus described our invention, what we claim as new and desire to secure by Letters Patent is:

1. The herein described process of removing impurities from lead which comprises slowly adding an oxidizing agent in catalytic amounts selected from the group comprising sodium nitrate and potassium nitrate into a bath of molten impure lead free from caustic alkali and at a temperature varying from 350° C. to 540° C. and bringing the oxidizing agent intimately into contact with all portions of the lead bath as rapidly as it is added and removing the dross thus formed.

2. The herein described process of removing impurities from lead which comprises stirring the molten impure lead free from caustic alkali and at a temperature varying from 350° C. to 540° C. in such a manner as to produce a pronounced vortex, slowly adding an oxidizing agent in catalytic amounts selected from the group comprising sodium nitrate and potassium nitrate, and removing the dross thus formed.

3. The herein described process of removing impurities from lead which comprises stirring the molten impure lead in such a manner as to produce a pronounced vortex, adding an oxidizing agent selected from the group comprising sodium nitrate and potassium nitrate free from caustic alkali at a rate not greater than one-half pound per minute per ton of lead being treated, and removing the dross thus formed.

4. The herein described process of refining molten impure lead by removing impurities selected from the group consisting of zinc, arsenic, antimony, and tin, which comprises slowly adding an oxidizing agent in catalytic amounts selected from the group comprising sodium nitrate and potassium nitrate into a bath of molten impure lead free from caustic alkali and at a temperature varying from 350° C. to 540° C., bringing the oxidizing agent intimately into contact with all portions of the lead bath as rapidly as it is added, and removing the dross thus formed.

5. The herein described process of removing impurities from lead which comprises stirring the molten impure lead at a temperature above its melting point and below a dull red heat in such a manner as to produce a pronounced vortex, slowly adding an oxidizing agent in catalytic amounts selected from the group comprising sodium nitrate and potassium nitrate which is free from caustic alkali, and removing the dross thus formed.

6. The herein described process of removing impurities from lead which comprises heating the lead to a temperature varying from 350° C. to 540° C., generating an impelling pressure to stir the lead with a swirling motion and produce a pronounced vortex, adding an oxidizing agent selected from the group comprising sodium nitrate and potassium nitrate at a rate not greater than one-half pound per minute per ton of lead in the bath, and removing the dross thus formed.

7. The herein described process of refining lead by selective oxidation of the impurities at the moment of reaction with the oxidizing agent which comprises slowly adding an oxidizing agent in catalytic amounts selected from the group comprising sodium nitrate and potassium nitrate into a bath of molten impure lead free from caustic alkali and at a temperature varying from 350° C. to 540° C., and bringing the oxidizing agent into contact with all portions of the lead bath while the oxidizing action is taking place.

8. The herein described process of refining molten impure lead by removing impurities selected from the group consisting of zinc, arsenic, antimony, and tin by selective oxidation thereof at the moment of reaction with the oxidizing agent which comprises slowly adding in catalytic amounts an oxidizing agent selected from the group comprising sodium nitrate and potassium nitrate into a bath of molten impure lead free from caustic alkali and at a temperature varying from 350° C. to 540° C., and bringing the oxidizing agent into contact with all portions of the lead bath while the oxidizing action is taking place.

9. The herein described process of refining molten impure lead at a temperature varying from 350° C. to 540° C. by removing impurities which are more readily oxidized than lead, which comprises adding an oxidizing agent in catalytic amounts selected from the group comprising sodium nitrate and potassium nitrate into a bath of molten impure lead and bringing the oxidizing agent into contact with all portions of the lead bath free from caustic alkali while the oxidizing action is taking place.

10. The herein described process of refining molten impure lead at a temperature varying from 350° C. to 540° C. by removing impurities which are more readily oxidized than lead, which comprises stirring the molten impure lead with a swirling motion to produce a pronounced vortex and slowly adding an oxidizing agent in catalytic amounts selected from the group comprising sodium nitrate and potassium nitrate which is free from caustic alkali.

11. The herein described process of refining molten impure lead by removing impurities which are more readily oxidized than lead, which comprises stirring the molten impure lead in the absence of caustic alkali at a temperature between 350° C. and 540° C. with a swirling motion to produce a pronounced vortex, and adding sodium nitrate at a rate of not over one-half pound per minute per ton of lead in the bath, and removing the dross thus formed.

12. The method of producing a catalytic reaction with impurities contained in a molten lead bath free from caustic alkali and at a temperature varying from 350° C. to 540° C. comprising stirring the molten impure lead in such a manner as to produce a pronounced vortex, adding alkali nitrate in catalytic amounts and bringing it into intimate contact with all the particles of the molten lead bath and selectively oxidizing the impurities at the moment of reaction with the alkali nitrate.

13. The method of producing a catalytic reaction with impurities contained in a molten lead bath maintained at a temperature varying from 350° C. to 540° C. comprising stirring the molten impure lead in such a manner as to produce a pronounced vortex, adding sodium nitrate in catalytic amounts and bringing it into intimate contact with all the particles of the molten lead bath in the absence of caustic alkali and selectively oxidizing the impurities at the moment of reaction with the sodium nitrate.

BERRY M. O'HARRA.
RAYMOND L. HALLOWS.